US011520994B2

(12) United States Patent
Hirao et al.

(10) Patent No.: US 11,520,994 B2
(45) Date of Patent: Dec. 6, 2022

(54) SUMMARY EVALUATION DEVICE, METHOD, PROGRAM, AND STORAGE MEDIUM

(71) Applicant: NIPPON TELEGRAPH AND TELEPHONE CORPORATION, Tokyo (JP)

(72) Inventors: Tsutomu Hirao, Tokyo (JP); Masaaki Nagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 176 days.

(21) Appl. No.: 16/975,365

(22) PCT Filed: Feb. 14, 2019

(86) PCT No.: PCT/JP2019/005374
§ 371 (c)(1),
(2) Date: Aug. 24, 2020

(87) PCT Pub. No.: WO2019/163642
PCT Pub. Date: Aug. 29, 2019

(65) Prior Publication Data
US 2020/0401767 A1    Dec. 24, 2020

(30) Foreign Application Priority Data
Feb. 26, 2018    (JP) .............................. JP2018-032553

(51) Int. Cl.
*G06F 40/30*    (2020.01)
*G06F 16/35*    (2019.01)
(Continued)

(52) U.S. Cl.
CPC ............ *G06F 40/30* (2020.01); *G06F 16/345* (2019.01); *G06F 16/355* (2019.01);
(Continued)

(58) Field of Classification Search
None
See application file for complete search history.

(56) References Cited

U.S. PATENT DOCUMENTS 10,599,722 B1 * 3/2020 Ewing ..................... G06F 16/93
10,977,573 B1 * 4/2021 Dalton ................... G06F 16/951
(Continued)

OTHER PUBLICATIONS

Kiyoumarsi, Farshad. "Evaluation of automatic text summarizations based on human summaries." Procedia-Social and Behavioral Sciences 192 (2015): 83-91. (Year: 2015).*

(Continued)

*Primary Examiner* — Douglas Godbold (57) ABSTRACT

The present disclosure relates to a method of evaluating accuracy of a summary of a document. The method includes receiving a plurality of reference summaries of a document and a system summary of the document. The system summary is generated by a machine. The method further includes extracting, for each reference summary, a tuple that is a pair of words composed of a modified word and a dependent word having a dependency relation to the modified word and a label representing the dependency relation. The method further includes replacing, for each of the extracted tuples, each of the modified word of the tuple's word pair and the dependent word with a class predetermined for the words. The method further generates a score of the system summary based on the class and a set of tuples of the system summary.

20 Claims, 4 Drawing Sheets

(51) Int. Cl.
*G06F 40/279* (2020.01)
*G06F 40/211* (2020.01)
*G06F 16/34* (2019.01)
*G06V 30/40* (2022.01)

(52) U.S. Cl.
CPC .......... *G06F 40/211* (2020.01); *G06F 40/279* (2020.01); *G06V 30/40* (2022.01)

(56) References Cited

U.S. PATENT DOCUMENTS

| | | | | |
|---|---|---|---|---|
| 2012/0233150 | A1* | 9/2012 | Naim | G06F 40/169 707/739 |
| 2014/0156264 | A1* | 6/2014 | Etzioni | G06F 40/211 704/9 |
| 2016/0062986 | A1* | 3/2016 | Seuss | G06T 11/60 704/9 |
| 2017/0132526 | A1* | 5/2017 | Cohen | G06N 20/00 |
| 2018/0032609 | A1* | 2/2018 | Allen | G06F 16/3326 |
| 2018/0196804 | A1* | 7/2018 | Mani | G06F 16/93 |
| 2018/0300400 | A1* | 10/2018 | Paulus | G06N 3/0454 |
| 2019/0278835 | A1* | 9/2019 | Cohan | G06F 16/93 |

OTHER PUBLICATIONS

Graham, Yvette. "Re-evaluating automatic summarization with BLEU and 192 shades of ROUGE." Proceedings of the 2015 conference on empirical methods in natural language processing. 2015. (Year: 2015).*

Lin, Chin-Yew, and Eduard Hovy. "Automatic evaluation of summaries using n-gram co-occurrence statistics." Proceedings of the 2003 human language technology conference of the North American chapter of the association for computational linguistics. 2003. (Year: 2003).*

Lin, Chin-Yew. "Rouge: A package for automatic evaluation of summaries." Text summarization branches out. 2004. (Year: 2004).*

Hovy, Eduard, et al., "Automated Summarization Evaluation with Basic Elements," In Proceedings of the 5th International Conference on Language Resource and Evaluation (LREC) May 22, 2006.

* cited by examiner

<John, went, nsubj>,
<to, store, case>
<the, store, det>
<went, store, nmod>

↓

<$C_{43}$, $C_{78}$, nsubj>,
<$C_{12}$, $C_{112}$, case>
<$C_1$, $C_{112}$, det>
<$C_{65}$, $C_{112}$, nmod>

Fig. 4

SUMMARY EVALUATION DEVICE, METHOD, PROGRAM, AND STORAGE MEDIUM

CROSS-REFERENCE TO RELATED APPLICATIONS

This application is a U.S. 371 Application of International Patent Application No. PCT/JP2019/005374, filed on 14 Feb. 2019, which application claims priority to and the benefit of JP Application No. 2018-032553, filed on 26 Feb. 2018, the disclosures of which are hereby incorporated herein by reference in their entireties.

TECHNICAL FIELD

The present invention relates to a summary evaluation device, method, and program, and a storage medium, and particularly, relates to a summary evaluation device, method, and program, and a storage medium for evaluating a system summary.

BACKGROUND ART

Conventionally, in a natural language processing field of automatically processing a language using a computer, a technique of automatically scoring a system summary using the summary (hereinafter, a reference summary) of correct answers created by persons when the reference summary is given.

As an automated summary evaluation method, a Basic Elements store determined on the basis of a word pair having a dependency relation common to a reference summary and a candidate summary and a tuple t=<h,m,rel> of the relation is known. h, m, and rel are a head word, a modifier word, and a dependency relation. For example, from a sentence "The dog likes eating sausage.", a set of tuples including <dog,The,det>, <likes,dog,nsubj>, <likes,eating,xcomp>, and <eating,sausage,dobj> are obtained.

Now, it will be assumed that a set of reference summaries $$(R=\{R_1, R_2, \ldots, R_K\})$$

is given, a set of tuples obtained from an i-th reference summary is defined as $T_i$, and a set of tuples obtained from all reference summaries is defined as below.

$$T = \cup_{i=1}^{K} T_i$$

In this case, a BE score of a system summary S is calculated by Equation (1) below.

[Formula 1]

$$BE(R, S) = \frac{\sum_{i=1}^{K} \sum_{j=1}^{|T|} \min\{N(t_j, R_i), N(t_j, S)\}}{\sum_{i=1}^{K} \sum_{j=1}^{|T|} N(t_j, R_i)} \quad (1)$$

$N(t_j, R_i)$ represents the frequency in the i-th reference summary of the j-th tuple, and $N(t_j, S)$ represents the frequency in a system summary of the j-th tuple.

CITATION LIST

Non Patent Literature

[NPL 1] Hovy, E., Lin, C. Y. Zhou, L. and Fukumoto, J. "Automated Summarization Evaluation with Basic Elements". In Proceedings of the 5th International Conference on Language Resource and Evaluation (LREC), 2006

SUMMARY OF THE INVENTION

Technical Problem

As obvious from Equation (1) above, the BE score assigns a higher score to a tuple appearing across a plurality of reference summaries. That is, there is a great gap in the scores acquired by tuples, specifically, between a tuple appearing in a plurality of reference summaries and a tuple appearing in only one reference summary. For example, since such a noun as becoming the subject of a summary is accompanied by an article and appears in many reference summaries, if a system summary includes such a tuple, the summary tends to get a higher score. In this case, a tuple <dog,The,det> appears in K reference summaries, and a tuple <likes,dog,nsubj> indicating important context information that "dog" is the subject of a verb "likes" appears only once in one reference summary. In this case, if the system summary includes <dog,The,det> at least once in any context, the system summary gets at least K points. On the other hand, a system summary including only <likes,dog,nsubj> gets only one point, and the difference in the scores of both summaries is at least K−1 points, which is very large. Generally, since a tuple "article+noun" itself does not include context information, it is a problem that it gets a higher score just due to the fact that it has article and noun. Moreover, it is determined that a tuple of a system summary is identical to a tuple of a reference summary when the character strings of both are perfectly identical. Therefore, it cannot be determined that tuples <John,killed,nsubjpass> and <John,murdered, nsubjpass> having substantially the same meaning are identical.

The present invention has been made to solve the above-described problems, and an object thereof is to provide a summary evaluation device, method, and program, and a storage medium capable of evaluating a system summary with high accuracy.

Means for Solving the Problem

In order to attain the object, a summary evaluation device according to a first invention includes: a tuple extraction unit that extracts tuples which are sets of a word pair composed of a head word and a modifier word having a dependency relation and a label indicating the dependency relation for each of a plurality of reference summaries obtained in advance for a summary target document and a system summary generated for the summary target document by a system and replaces each of the head word and the modifier word of the word pair of each of the extracted tuples with a class determined in advance for words; and a score calculation unit that calculates a score of the system summary on the basis of a group of tuples of all the plurality of reference summaries and a group of tuples of the system summary, replaced with the classes.

A summary evaluation method according to a second invention executes the steps of: allowing a tuple extraction unit to extract tuples which are sets of a word pair composed of a head word and a modifier word having a dependency relation and a label indicating the dependency relation for each of a plurality of reference summaries obtained in advance for a summary target document and a system summary generated for the summary target document by a system and replace each of the head word and the modifier word of the word pair of each of the extracted tuples with a class determined in advance for words; and allowing a score calculation unit to calculate a score of the system summary on the basis of a group of tuples of all the plurality of reference summaries and a group of tuples of the system summary, replaced with the classes.

A program according to a third invention is a program for causing a computer to function as each unit of the summary evaluation device according to the first invention.

A storage medium according to a fourth invention is a storage medium storing a program for causing a computer to function as each unit of the summary evaluation device according to the first invention.

Effects of the Invention

According to the summary evaluation device, method, and program, and the storage medium of the present invention, it is possible to provide an advantage that a system summary can be evaluated with high accuracy by extracting tuples which are sets of a word pair composed of a head word and a modifier word having a dependency relation and a label indicating the dependency relation for each of a plurality of reference summaries obtained in advance for a summary target document and a system summary generated for the summary target document by a system, replacing each of the head word and the modifier word of the word pair of each of the extracted tuples with a class determined in advance for words, and calculating a score of the system summary on the basis of a group of tuples of all the plurality of reference summaries and a group of tuples of the system summary, replaced with the classes.

DESCRIPTION OF EMBODIMENTS

Hereinafter, an embodiment of the present invention will be described with reference to the drawings.

Overview of Embodiment of Present Invention

In the embodiment of the present invention, the above-mentioned two problems are solved according to a method of (1) not taking the frequency of a tuple into consideration during calculation of scores and (2) but taking a semantic class of a word into consideration in matching of tuples. Specifically, a system summary is evaluated by Equation (2) below.

[Formula 2]

$$mBE(R, S) = \frac{|T \cap T_S|}{|T|} \quad (2)$$

$T_s$ is a set of tuples obtained from a system summary. It is assumed that words of tuples included in $T, T_s$ are replaced with class IDs of classes corresponding to the words. Conversion from words to class IDs may be performed by clustering words using a K-means method, a hierarchical clustering method, or the like on the basis of a word vector and determining the class ID of a word according to a cluster ID.

Figure 1:
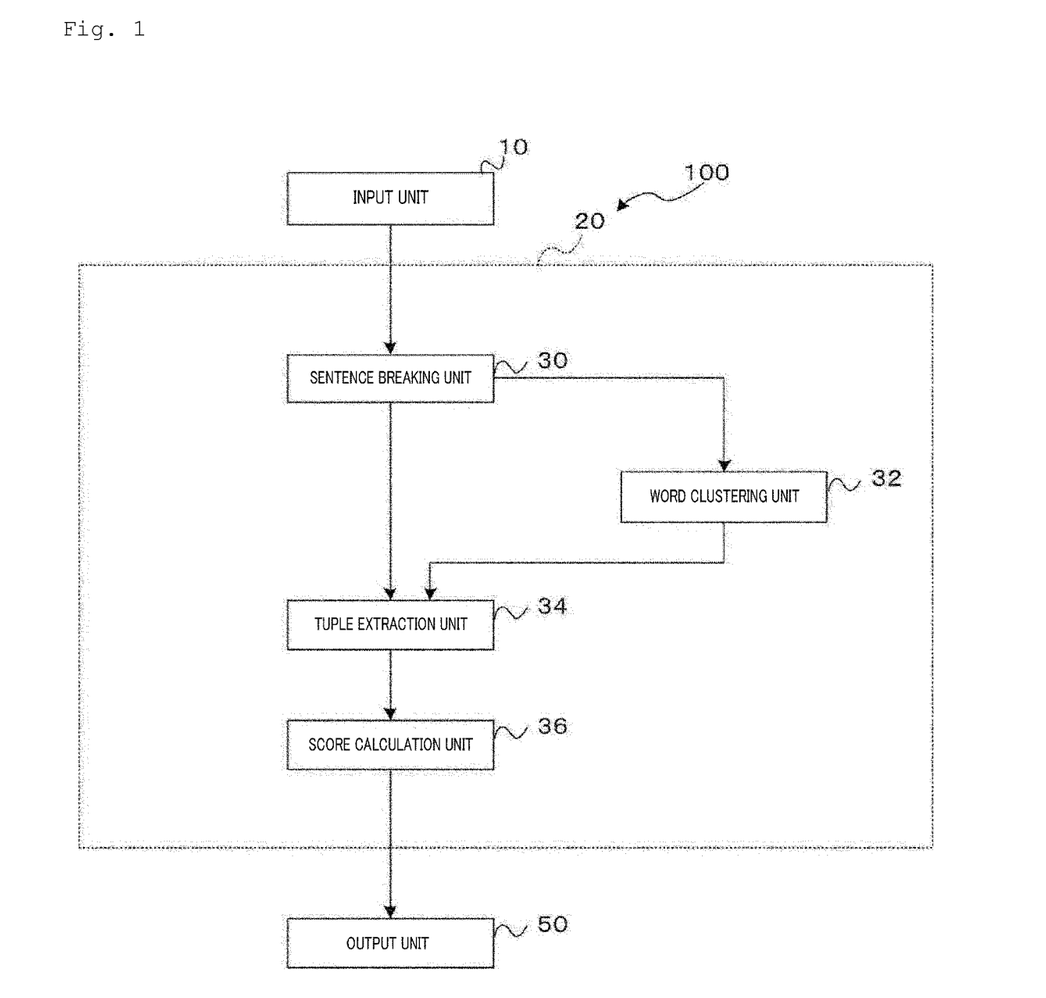
FIG. 1 is a block diagram illustrating a configuration of a summary evaluation device according to an embodiment of the present invention.

Configuration of Summary Evaluation Device According to Embodiment of Present Invention Next, a configuration of a summary evaluation device according to the embodiment of the present invention will be described. As illustrated in FIG. 1, a summary evaluation device 100 according to an embodiment of the present invention can be configured as a computer including a CPU, a RAM, and a ROM storing a program for executing a summary evaluation process routine to be described later and various pieces of data. The summary evaluation device 100 functionally includes an input unit 10, an arithmetic unit 20, and an output unit 50 as illustrated in FIG. 1.

The input unit 10 receives K reference summaries obtained in advance for a summary target document and a system summary generated for the summary target document by a system.

The arithmetic unit 20 includes a sentence breaking unit 30, a word clustering unit 32, a tuple extraction unit 34, and a score calculation unit 36.

The sentence breaking unit 30 breaks the K reference summaries and the system summary received by the input unit 10 into sentences. Sentence breaking may be performed using an existing sentence breaking tool, and breaking rules may be created on the basis of information such as punctuation marks to implement a breaker.

The word clustering unit 32 clusters words included in the K reference summaries and the system summary broken by the sentence breaking unit 30 using semantic vectors of words. Word clustering can be realized by expressing words as n-dimensional vectors and clustering the same on the basis of a cosine similarity between the vectors using a K-means method, a hierarchical clustering method, or the like. A tool such as word2vec may be used for expressing words as n-dimensional vectors.

Figure 2:
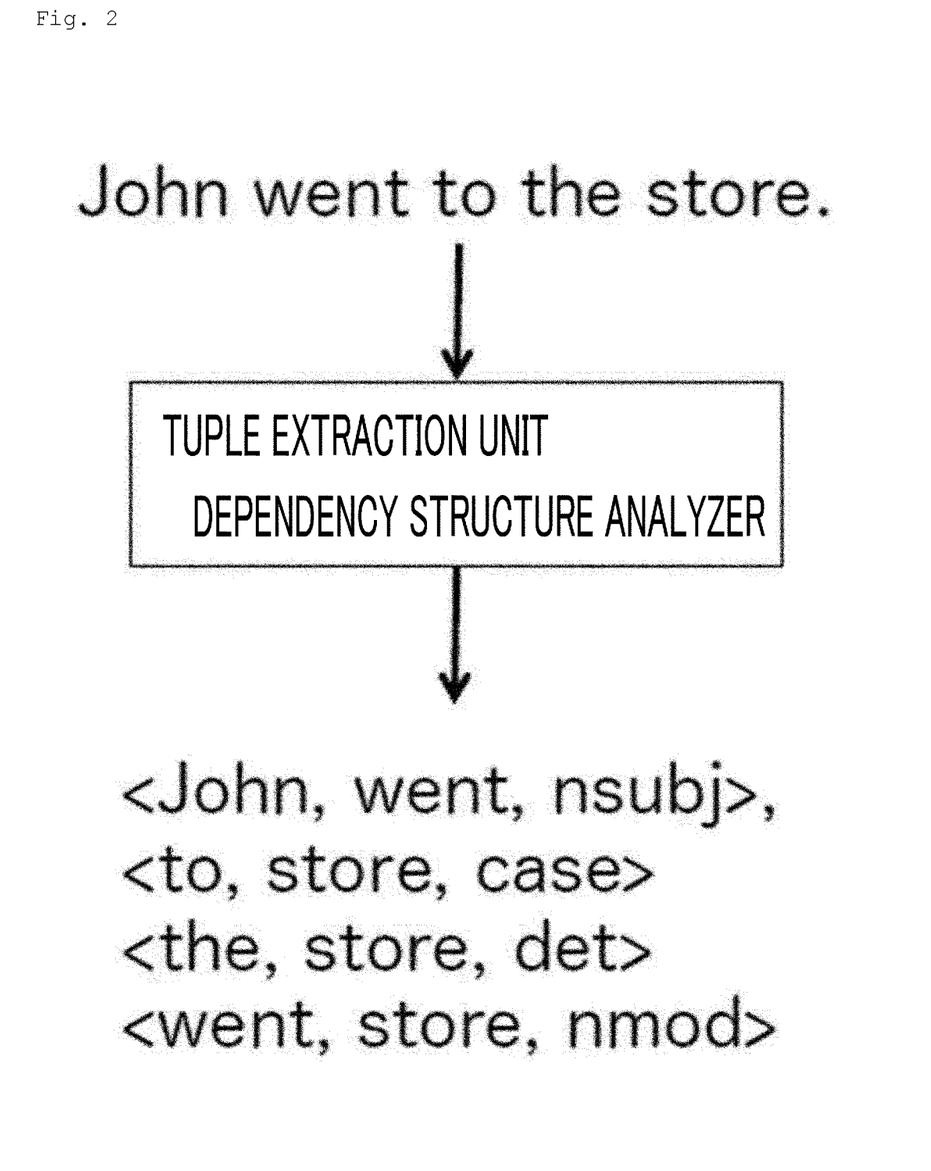
FIG. 2 is a diagram illustrating an example of performing dependency structure analysis to extract tuples.
Figure 3:
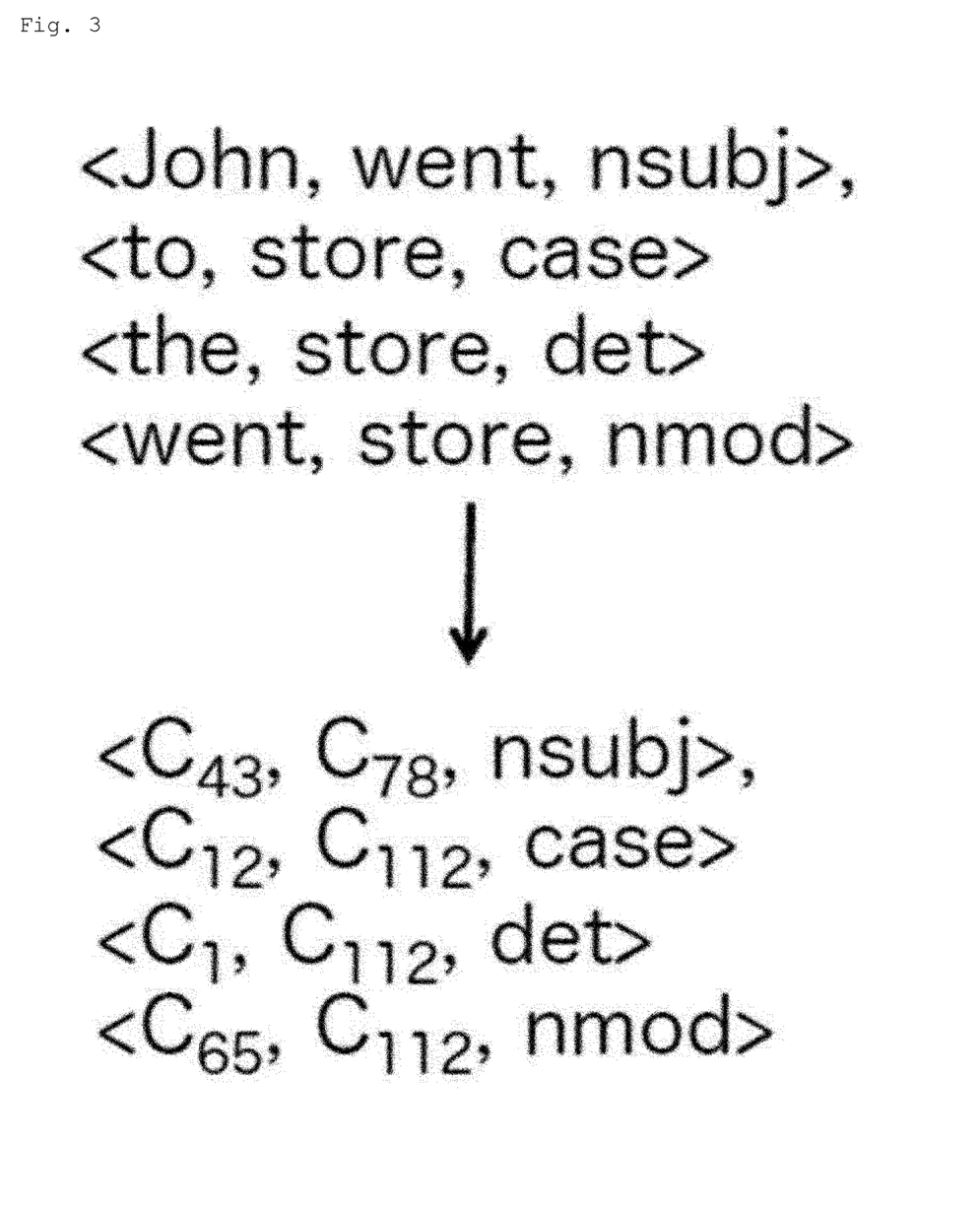
FIG. 3 is a diagram illustrating an example of replacing words in a tuple with class IDs.

The tuple extraction unit 34 extracts tuples which are sets of a word pair composed of a head word and a modifier word having a dependency relation and a label indicating the dependency relation for each of the K reference summaries and the system summary broken by the sentence breaking unit 30. For example, tuples are extracted by performing such dependency structure analysis as illustrated in FIG. 2. Subsequently, the tuple extraction unit 34 replaces each of the head word and the modifier word of the word pair of each of the extracted tuples with a class in the word clustering results of the word clustering unit 32. For example, as illustrated in FIG. 3, a word in a tuple is replaced with an index of a cluster, which is used as a class ID of a cluster to which the word belongs.

The score calculation unit 36 calculates a score corresponding to the degree of overlap between a group of tuples in all K reference summaries and a group of tuples of the system summary, replaced with the classes by the tuple extraction unit 34 according to Equation (3) below and outputs the calculated score to the output unit 50.

[Formula 3]

$$mBE(R, S) = \frac{|\mathcal{T} \cap T_S|}{|\mathcal{T}|} \quad (3)$$

As described above, since the reference summary and the system summary are grasped as a group of tuples obtained from a dependency structure and a score calculation formula that does not take the frequency of each tuple in an original summary into consideration, it is possible to prevent a situation in which a partial word can get a higher score. Moreover, since words constituting a tuple are replaced with class IDs of a word cluster, tuples having similar meanings can be regarded as being identical tuples. In this way, it is possible to evaluate a summary by taking a semantic class of words into consideration.

Operation of Summary Evaluation Device
According to Embodiment of Present Invention Next, an operation of the summary evaluation device 100 according to the embodiment of the present invention will be described. When the input unit 10 receives K reference summaries obtained in advance for a summary target document and a system summary generated for the summary target document by a system, the summary evaluation device 100 executes a summary evaluation process routine illustrated in FIG. 4.

Figure 4:
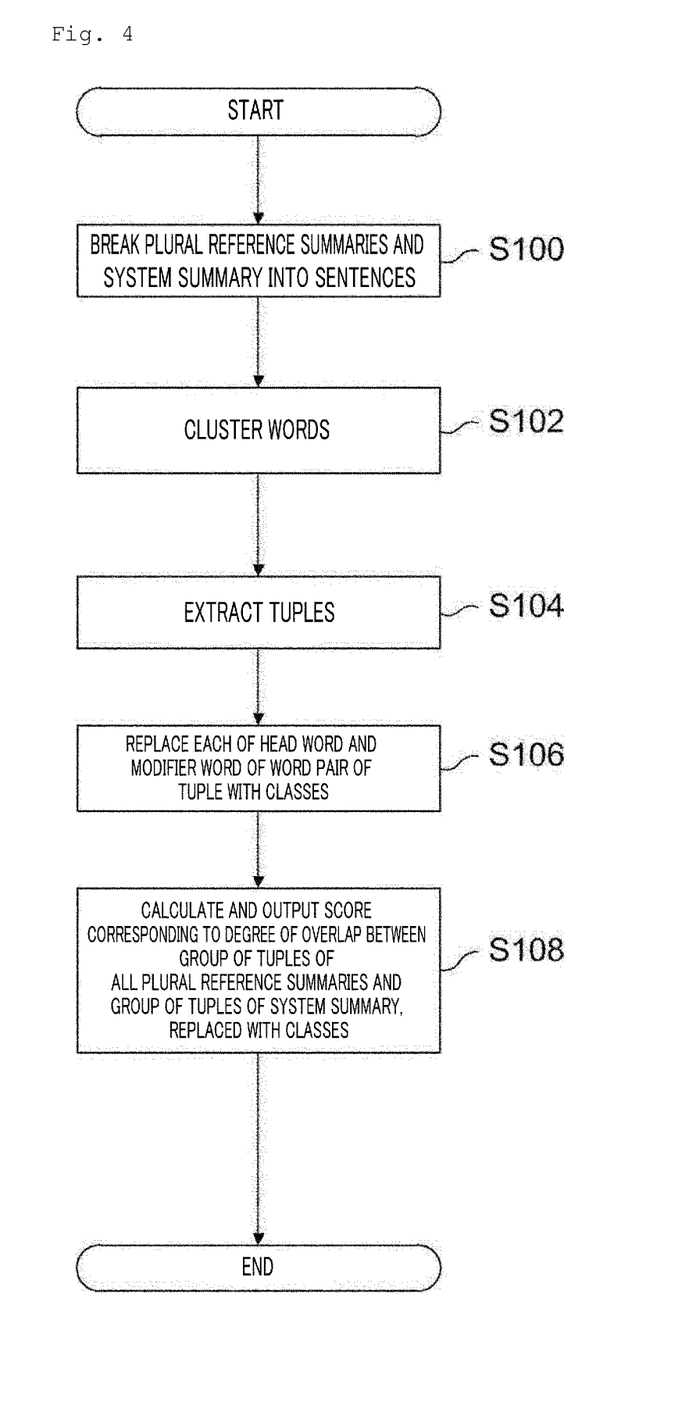
FIG. 4 is a flowchart illustrating a summary evaluation process routine in a summary evaluation device according to an embodiment of the present invention.

First, in step S100, the K reference summaries and the system summary received by the input unit 10 are broken into sentences.

Subsequently, in step S102, the words included in the K reference summaries and the system summary broken in step S100 are clustered using semantic vectors of words.

In step S104, tuples which are sets of a word pair composed of a head word and a modifier word having a dependency relation and a label indicating the dependency relation for each of the K reference summaries and the system summary broken in step S100.

In step S106, each of the headword and the modifier word of the word pair of each of the tuples extracted in step S104 is replaced with a class in the word clustering results in step S102.

In step S108, a score corresponding to the degree of overlap between a group of tuples in all K reference summaries and a group of tuples of the system summary, replaced with the classes by the tuple extraction unit 34 is calculated according to Equation (3) above and is output to the output unit 50.

As described above, according to the summary evaluation device according to the embodiment of the present invention, it is possible to evaluate a system summary with high accuracy according to the following steps.

(1) Tuples which are sets of a word pair composed of a head word and a modifier word having a dependency relation and a label indicating the dependency relation for each of a plurality of reference summaries obtained in advance for a summary target document and a system summary generated for the summary target document by a system.

(2) Each of the head word and the modifier word of the word pair of each of the extracted tuples is replaced with a class determined in advance for a word.

(3) A score of the system summary is calculated on the basis of a group of tuples for all the plurality of reference summaries and a group of tuples of the system summary, replaced with the classes.

The present invention is not limited to the above-described embodiment, and various modifications and applications can be made without departing from the spirit of the present invention.

For example, in the above-described embodiment, a case of replacing the head word and the modifier word with class IDs has been described as an example. However, the present invention is not limited thereto, but a word may be replaced with a value or the like corresponding to a cluster to which the word belongs.

For example, in the above-described embodiment, a case in which a summary is broken into sentences by the sentence breaking unit 30 and words the summary are clustered by the word clustering unit 32 has been described. However, the present invention is not limited thereto, but the sentence breaking unit 30 and the word clustering unit 32 may not be provided and a reference summary and a system summary which are broken into sentences in advance, and a clustering result may be received in advance.

In the above-described embodiment, although an embodiment in which a program is installed in advance has been described, the program may be provided in a state of being stored in a computer-readable recording medium and may be provided via a network.

REFERENCE SIGNS LIST

10 Input unit
20 Arithmetic unit
30 Sentence breaking unit
32 Word clustering unit
34 Tuple extraction unit
36 Score calculation unit
50 Output unit
100 Summary evaluation device

The invention claimed is:

1. A computer-implemented method for evaluating aspects of a document, the method comprising:
receiving a plurality of reference summaries of the document;
receiving a system summary of the document, wherein the system summary is a machine-generated summary of the document;
generating at least a first set of tuples for one of the plurality of reference summaries and at least a second set of tuples for the system summary, wherein each tuple comprises:
a head word,
a modifier word having a dependency relation with the head word, and
a label indicating the dependency relation based on one or more reference summaries of the plurality of reference summaries and the system summary;
for each of one or more tuples of at least the first and the second sets of tuples, replacing the head word with a first class of words and the modifier word with a second class of words, wherein the head word and the first class of words are substantially similar in multi-dimensional vector forms;
determining a score of the system summary for evaluating the system summary of the document based at least on a common set of tuples between the first set of tuples of the plurality of reference summaries with the replaced first class of words and the second set of tuples of the system summary with the replaced second class of words; and providing the score.

2. The computer-implemented method of claim 1, the method further comprising:

receiving a plurality of semantic vectors of words; and determining a plurality of classes based clustering the plurality of semantic vectors, the plurality of classes including the first class and the second class.

3. The computer-implemented method of claim 1, the method further comprising:

determining the score based on a degree of overlap between sets of tuples for the plurality of reference summaries and the second set of tuples.

4. The computer-implemented method of claim 1, wherein each class represents a plurality of words corresponding to a clustered set of semantic vectors based on a cosine similarity among the semantic vectors.

5. The computer-implemented method of claim 1, the method further comprising:

extracting one or more sentences from the one or more of the plurality of reference summaries and the system summary;

generating a plurality of classes based on clustering a plurality of words in the extracted one or more sentences; and extracting a plurality of pairs of words from the one or more sentences for generating tuples.

6. The computer-implemented method of claim 1, wherein the determining the score is independent of a frequency of tuples appearing at least in the first set of tuples and the second set of tuples.

7. The computer-implemented method of claim 1, wherein the generating the at least a first set of tuples for one of the plurality of reference summaries is based on a first dependency structure analyses of a first set of words in the plurality of reference summaries.

8. A system for evaluating aspects of a document, the system comprises:

a processor; and a memory storing computer-executable instructions that when executed by the processor cause the system to:

receive a plurality of reference summaries of the document;

receive a system summary of the document, wherein the system summary is a machine-generated summary of the document;

generate at least a first set of tuples for one of the plurality of reference summaries and at least a second set of tuples for the system summary, wherein each tuple comprises:

a head word, a modifier word having a dependency relation with the head word, and a label indicating the dependency relation based on one or more reference summaries of the plurality of reference summaries and the system summary;

for each of one or more tuples of at least the first and the second sets of tuples, replace the head word with a first class of words and the modifier word with a second class of words wherein the head word and the first class of words are substantially similar in multi-dimensional vector forms;

determine a score of the system summary for evaluating the system summary of the document based at least on a common set of tuples between the first set of tuples of the plurality of reference summaries with the replaced first class of words and the second set of tuples of the system summary with the replaced second class of words; and provide the score.

9. The system of claim 8, the computer-executable instructions when executed further causing the system to:

receive a plurality of semantic vectors of words; and determine a plurality of classes based clustering the plurality of semantic vectors, the plurality of classes including the first class and the second class.

10. The system of claim 8, the computer-executable instructions when executed further causing the system to:

determine the score based on a degree of overlap between sets of tuples for the plurality of reference summaries and the second set of tuples.

11. The system of claim 8, wherein each class represents a plurality of words corresponding to a clustered set of semantic vectors based on a cosine similarity among the semantic vectors.

12. The system of claim 8, the computer-executable instructions when executed further causing the system to:

extract one or more sentences from the one or more of the plurality of reference summaries and the system summary;

generate a plurality of classes based on clustering a plurality of words in the extracted one or more sentences; and extract a plurality of pairs of words from the one or more sentences for generating tuples.

13. The system of claim 8, wherein the determining the score is independent of a frequency of tuples appearing at least in the first set of tuples and the second set of tuples.

14. The system of claim 8, wherein the generating the at least a first set of tuples for one of the plurality of reference summaries is based on a first dependency structure analyses of a first set of words in the plurality of reference summaries.

15. A computer-readable non-transitory recording medium storing computer-executable instructions that when executed by a processor cause a computer system to:

receive a plurality of reference summaries of the document;

receive a system summary of the document, wherein the system summary is a machine-generated summary of the document;

generate at least a first set of tuples for one of the plurality of reference summaries and at least a second set of tuples for the system summary, wherein each tuple comprises:

a head word, a modifier word having a dependency relation with the head word, and a label indicating the dependency relation based on one or more reference summaries of the plurality of reference summaries and the system summary;

for each of one or more tuples of at least the first and the second sets of tuples, replace the head word with a first class of words and the modifier word with a second class of words wherein the head word and the first class of words are substantially similar in multi-dimensional vector forms;

determine a score of the system summary for evaluating the system summary of the document based at least on a common set of tuples between the first set of tuples of the plurality of reference summaries with the replaced first class of words and the second set of tuples of the system summary with the replaced second class of words; and provide the score.

16. The computer-readable non-transitory recording medium of claim 15, the computer-executable instructions when executed further causing the system to:

receive a plurality of semantic vectors of words; and determine a plurality of classes based clustering the plurality of semantic vectors, the plurality of classes including the first class and the second class.

17. The computer-readable non-transitory recording medium of claim 15, the computer-executable instructions when executed further causing the system to:

determine the score based on a degree of overlap between sets of tuples for the plurality of reference summaries and the second set of tuples.

18. The computer-readable non-transitory recording medium of claim 15, wherein each class represents a plurality of words corresponding to a clustered set of semantic vectors based on a cosine similarity among the semantic vectors.

19. The computer-readable non-transitory recording medium of claim 15, the computer-executable instructions when executed further causing the system to:

extract one or more sentences from the one or more of the plurality of reference summaries and the system summary;

generate a plurality of classes based on clustering a plurality of words in the extracted one or more sentences; and extract a plurality of pairs of words from the one or more sentences for generating tuples.

20. The computer-readable non-transitory recording medium of claim 15, wherein the determining the score is independent of a frequency of tuples appearing at least in the first set of tuples and the second set of tuples.

* * * * *